US012592484B2

(12) United States Patent
West et al.

(10) Patent No.: US 12,592,484 B2
(45) Date of Patent: Mar. 31, 2026

(54) RAPID-DEPLOYMENT HEMISPHERICAL ACTIVE ELECTRONICALLY SCANNED ARRAY (AESA) FOR MOBILE SATELLITE COMMUNICATION (SATCOM) OPERATIONS

(71) Applicant: Rockwell Collins, Inc., Cedar Rapids, IA (US)

(72) Inventors: James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 327 days.

(21) Appl. No.: 18/545,390

(22) Filed: Dec. 19, 2023

(65) Prior Publication Data

US 2025/0202106 A1 Jun. 19, 2025

(51) Int. Cl.
*H01Q 1/08* (2006.01)
*H01Q 1/28* (2006.01)
(Continued)

(52) U.S. Cl.
CPC ................ *H01Q 3/26* (2013.01); *H01Q 1/08* (2013.01); *H01Q 1/288* (2013.01); *H01Q 1/42* (2013.01)

(58) Field of Classification Search
CPC ............ H01Q 3/26; H01Q 1/08; H01Q 1/288; H01Q 1/42; H01Q 1/1235; H01Q 3/12;
(Continued)

(56) References Cited

U.S. PATENT DOCUMENTS 5,515,065 A * 5/1996 Sherwood ............ H01Q 1/3275 343/882
5,619,215 A 4/1997 Sydor
(Continued)

FOREIGN PATENT DOCUMENTS

CN 104009297 A 8/2014
CN 103682651 B1 3/2017
(Continued)

OTHER PUBLICATIONS

European Patent Office, Extended European Search Report received in EP Application No. 24214038.2, Apr. 29, 2025, 8 pages.
(Continued)

*Primary Examiner* — Nimesh Patel
(74) *Attorney, Agent, or Firm* — Suiter Swantz IP

(57) ABSTRACT

A satellite communications (satcom) terminal apparatus includes an active electronically scanned array (AESA) having stowed and deployed configurations and attachable atop a mobile platform or other flat surface. The AESA comprises a set of panels, each panel a subarray of AESA elements. A set of side panels are attached to a flat surface and an apex panel attached to the top edge of each side panel. When stowed, the apex and side panels lie flat (e.g., for geostationary earth orbit (GEO) operations). When deployed, the side panels and apex panel form a truncated pyramid with a hemispherical field of view for middle earth orbit (MEO) or low earth orbit (LEO) operations. The side panels may be pivoted to any desired slant angle and each subarray panel configured for transmission or reception of electromagnetic energy at a desired frequency or polarization, enabling simultaneous mobile operations with multiple satellites or constellations.

20 Claims, 9 Drawing Sheets

(51) Int. Cl.
*H01Q 1/42* (2006.01)
*H01Q 3/26* (2006.01)

(58) Field of Classification Search
CPC ...... H01Q 3/34; H01Q 21/061; H01Q 1/1264; H01Q 3/08; H01Q 3/46; H01Q 21/0025; H01Q 21/0087; H01Q 21/064; H01Q 21/065; H01Q 21/24; H01Q 3/36; H01Q 21/28; H01Q 21/00; H01Q 21/062; H01Q 19/062; H01Q 9/0414; H01Q 3/2694; H01Q 3/245; H01Q 3/267; H01Q 25/02; H01Q 3/2682; H01Q 15/24; H01Q 21/26; H01Q 25/00; H01Q 3/30; H01Q 15/242; H01Q 21/0006; H01Q 25/007; H01Q 5/25; H01Q 3/14; H01Q 1/12; H01Q 1/1207; H01Q 3/2652; H01Q 3/32; H01Q 21/29; H01Q 3/24; H01Q 3/443; H01Q 5/35; H01Q 9/0407; H01Q 9/0435; H01Q 1/125; H01Q 1/282; H01Q 1/34; H01Q 1/50; H01Q 9/285; H01Q 3/40; H01Q 3/2658; H01Q 3/04; H01Q 21/0012; H01Q 21/20; H01Q 1/3275; H01Q 1/3283; H01Q 1/3291; H01Q 3/385; H01Q 1/325; H01Q 1/2283; H01Q 1/28; H01Q 1/523; H01Q 21/245; H01Q 25/001; H01Q 5/378; H01Q 21/06; H04B 7/18519; H04B 7/18573; H04B 7/18517; H04B 7/18508; H04B 7/0486; H04B 7/0817; H04B 7/0854; H04B 7/0857; H04B 7/0874; H04B 7/18515; H04B 1/3822; H04B 7/0413; H04B 17/12; H04B 17/21; H04B 17/221; H04B 7/0617; H04B 7/18513; H04B 17/0085; H04B 5/20; H04B 7/0408; H04B 7/086; H04B 7/10; H04B 5/73; H04B 17/345; H04B 17/318; H04B 17/336; H04B 7/1853; H04B 7/0691; H04B 7/0834; H04B 7/185; H04B 7/18504; H04B 7/18528; H04B 7/19; H04B 7/18571; H04B 7/18506; H04B 7/1851; H04B 10/118; Y02D 30/70; G01S 7/032; G01S 2013/0254; G01S 13/87; G01S 13/88; G01S 13/951; G01S 2013/0272; G01S 2013/916; G01S 7/023; G01S 7/003; G01S 13/931; G01S 13/933; G01S 17/931; G01S 19/02; G01S 19/49; G01S 2013/0245; G01S 7/024; H04W 16/18; H04W 4/40; H04W 52/241; H04W 84/06
See application file for complete search history.

(56) References Cited

U.S. PATENT DOCUMENTS

| | | | | |
|---|---|---|---|---|
| 6,297,774 | B1 * | 10/2001 | Chung ............... | H01Q 21/0087 343/700 R |
| 6,774,851 | B1 | 8/2004 | Cuhaci et al. | |
| 8,334,809 | B2 | 12/2012 | Nichols et al. | |
| 8,451,165 | B2 | 5/2013 | Puzella et al. | |
| 9,048,544 | B2 | 6/2015 | Georgiadis et al. | |
| 9,621,850 | B1 | 4/2017 | Mitchell | |
| 9,711,850 | B2 | 7/2017 | Naym et al. | |
| 10,276,926 | B2 | 4/2019 | Cwik et al. | |
| 10,833,404 | B1 | 11/2020 | Kaddour et al. | |
| 10,938,105 | B2 | 3/2021 | Snyder et al. | |
| 11,575,214 | B2 | 2/2023 | Hand et al. | |
| 2009/0180421 | A1 | 7/2009 | Hall et al. | |
| 2012/0249366 | A1 | 10/2012 | Pozgay et al. | |
| 2015/0102973 | A1 * | 4/2015 | Hand ...................... | H01Q 21/26 343/837 |
| 2017/0110803 | A1 | 4/2017 | Hodges et al. | |
| 2019/0140362 | A1 * | 5/2019 | Edenfield ............... | H01Q 21/24 |
| 2019/0221912 | A1 * | 7/2019 | Zhou ...................... | H01Q 15/14 |
| 2021/0249778 | A1 | 8/2021 | Achour et al. | |
| 2022/0239007 | A1 | 7/2022 | Biswas | |
| 2022/0285859 | A1 | 9/2022 | Biswas et al. | |
| 2022/0311506 | A1 * | 9/2022 | McGarrahan .......... | H04B 7/195 |
| 2022/0321239 | A1 * | 10/2022 | Buckley ................. | H01Q 1/526 |
| 2023/0223684 | A1 | 7/2023 | Turpin et al. | |
| 2023/0327754 | A1 | 10/2023 | Billman et al. | |
| 2025/0202104 | A1 * | 6/2025 | West ...................... | H01Q 1/288 |

FOREIGN PATENT DOCUMENTS

| | | | |
|---|---|---|---|
| EP | 0687389 | B1 | 9/1998 |
| EP | 1919029 | A3 | 5/2008 |
| EP | 3750211 | A4 | 12/2020 |
| EP | 4096117 | A1 | 11/2022 |
| EP | 4120585 | A1 | 1/2023 |
| IL | 69745 | A | 8/1987 |
| IN | 202141041836 | A | 11/2021 |
| WO | 2023148474 | A1 | 8/2023 |

OTHER PUBLICATIONS

He et al., "A Review of Multibeam Phased Array Antennas as LEO Satellite Constellation Ground Station," IEEE Access, vol. 4, 2016, 13 pages.

Rubio et al., "A Deployable Hexagonal Reflectarray Antenna for Space Applications," 2021 United States National Committee of URSI National Radio Science Meeting, Jan. 4, 2021, 2 pages.

David M. Pozar et al. "Design of millimeter wave microstrip reflectarrays" IEEE Transactions on Antennas and Propagation (vol. 45, Issue 2, pp. 287-296 Feb. 1997; https://ieeexplore.IEEE.org/stamp/stamp.jsp?tp=&arnumber=560348 (Oct. 31, 2023).

* cited by examiner

RAPID-DEPLOYMENT HEMISPHERICAL ACTIVE ELECTRONICALLY SCANNED ARRAY (AESA) FOR MOBILE SATELLITE COMMUNICATION (SATCOM) OPERATIONS

CROSS-REFERENCE TO RELATED APPLICATIONS

The present application is related to, and incorporates herein by reference in its entirety, the concurrently filed U.S. Patent Application entitled RAPID-DEPLOYMENT REFLECTARRAY ARCHITECTURE FOR MOBILE SATELLITE COMMUNICATION (SATCOM) OPERATIONS and having Ser. No. 18/545,441.

BACKGROUND

Conventional terminals for satellite-based tactical communications (satcom; including low earth orbit (LEO), middle earth orbit (MEO) and/or geosynchronous orbit (GEO) satellites and/or constellations thereof) are heavy, cumbersome apparatus that require significant amounts of time (c. 30 minutes) to assemble and acquire satellite connectivity, both of which are problematic in a war theater where mobility, speed, and undetectability are all essential. Prior attempts to solve this problem, e.g., Cubic's Ground-to-Air Transmit and Receive (GATR) satellite antenna system is likewise heavy, cumbersome, and effective only for stationary comms-on-the-halt (COTH) operations (also comms-on-the-pause (COTP), e.g., as opposed to mobile comms-on-the-move (COTM) operations) with GEO satellites only, leaving the apparatus both vulnerable to attack and limited in scope. Further, the inflatable radome requires time to inflate and may be vulnerable to wind loading issues, requiring a power-hungry motion control system to maintain a satellite link with narrow bandwidth antennas.

SUMMARY

In an aspect, a mobile satellite communications (satcom) terminal apparatus is disclosed. In embodiments, the satcom terminal apparatus is attachable to a flat surface, e.g., atop a trailer or other mobile platform, or detachable from the trailer and configured for setup and operations on the ground. In some embodiments, the satcom terminal apparatus may be configured for limited use (e.g., in the stowed configuration and possibly in the deployed configuration) while the mobile platform is in motion. The satcom terminal apparatus includes an active electronically scanned array (AESA) having stowed and deployed configurations. The AESA includes a set of subarray panels, side panels pivotably attached to the flat surface and a polygonal apex panel attached to the top edge of each side panel, each subarray panel including an array of AESA elements or apertures. When stowed, the side panels and apex panels are disposed substantially flat and coplanar with the flat surface, e.g., for geostationary orbit (GEO) operations. The AESA may be deployed by pivoting the side panels to a desired slant angle relative to the flat surface, the side panels and apex panel collectively forming a truncated pyramid such that the AESA as a whole has a hemispherical field of view, e.g., for middle earth orbit (MEO) or low earth orbit (LEO) operations. Each subarray panel may be individually configured via an array controller for electromechanically steerable transmission and reception of electromagnetic (EM) radiation at a selectable frequency or polarization (and/or according to other selectable array attributes).

In some embodiments, the array controller manages the selection of the slant angle for each side AESA panel as well as deployment of the AESA panels from the stowed configuration.

In some embodiments, the AESA panels are manually deployable between their stowed and deployed configurations.

In some embodiments, each AESA side panel is deployable to a common slant angle relative to the flat surface to which the satcom terminal apparatus is mounted or attached.

In some embodiments, each AESA side panel has a trapezoidal shape.

In some embodiments, the AESA further includes base AESA panels coplanar with the flat surface and disposed between each pair or adjacent side AESA panels such that the base panels remain in a fixed position whether or not the side panels are stowed or deployed.

In some embodiments, the flat surface to which the base AESA panels are mounted includes a gap between the base panel and each adjacent side AESA panel.

In some embodiments, the AESA of the satcom terminal apparatus is configured for half duplex transmission and reception of EM energy.

In some embodiments, the AESA of the satcom terminal apparatus is configured for full duplex transmission and reception of EM energy.

In some embodiments, the AESA of the satcom terminal apparatus is configured for transmission and reception within the C-, X-, Ku-, and/or Ka-bands.

In some embodiments, one or more subarray panels of the AESA are configured for digital beamforming.

In some embodiments, one or more AESA subarray panels may be protected by a dielectric ballistic material. For example, one or more subarray panels may incorporate a planar substrate fashioned from the dielectric ballistic material. Alternatively, the satcom terminal apparatus may include a radome covering and protecting the AESA subarray panels.

In some embodiments, the satcom terminal apparatus includes a protective cover electromechanically deployable to cover the AESA subarray panels when in the stowed configuration. In some embodiments, the protective cover may be fashioned such that the cover may function as a radome, allowing GEO operations by the AESA subarray panels in the stowed configuration.

In some embodiments, the AESA is rotatable relative to the flat surface (e.g., the top of the mobile platform to which the satcom terminal apparatus is mounted) or to absolute terrestrial coordinates (e.g., when the satcom terminal apparatus is detached from its mobile platform and configured for on-ground-use)

In some embodiments, the apex panel comprises a set of panel segments, each panel segment operable as an independent AESA subarray and pivotably attached to a central lead screw such that the panel segments may be configurable as a pyramid (e.g., at similar or different slant angles to the side AESA panels) or as an inverted pyramid by rotating the lead screw, e.g., clockwise or counterclockwise.

In some embodiments, the AESA apex panel segments are electromechanically configurable by the array controller.

In some embodiments, the satcom terminal apparatus is attached to a vehicle or mobile platform (e.g., via a flat surface or directly) for transport and/or satcom operations (e.g., while the mobile platform is stationary). In some embodiments the satcom terminal apparatus is configured for limited operations (e.g., in the stowed configuration, and maybe in the deployed configuration) when the mobile platform is in motion.

In some embodiments, the satcom terminal apparatus is detachable from the mobile platform (e.g., via a detachable pallet configurable for detachment and on-ground satcom operations).

In some embodiments, the array controller is disposed on or within the mobile platform and accepts control input, e.g., from an operator disposed on or inside the mobile platform.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
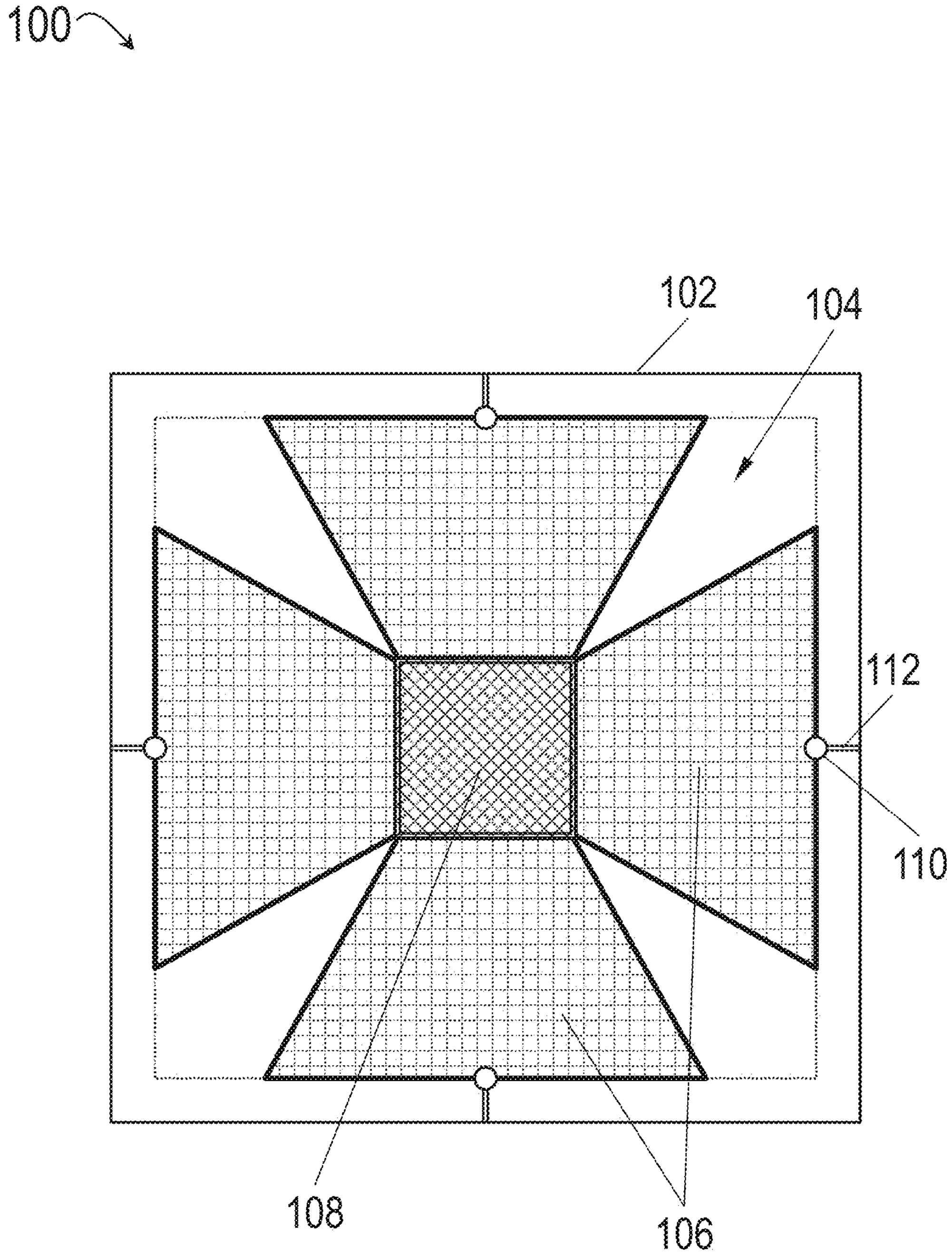
FIG. 1 is an overhead view of a satellite communications (satcom) terminal apparatus according to example embodiments of this disclosure, including an active electronically scanned array (AESA) in a stowed configuration.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a mobile satellite communications (satcom) terminal apparatus providing both comms-on-the-move (COTM) and comms-on-the-halt (COTH) capacity and minimal warfighter-free deployment time even for large size configurations. For example, the apparatus may be transported via ground vehicle, trailer, or other mobile platform (e.g., self-propelled, towed, and/or carried) and COTH capacity may be established within no more than a few minutes of the vehicle coming to a stop, with the vehicle providing a convenient command center. Similarly, limited COTM capacity may be achieved as described below. Embodiments of the satcom terminal apparatus described below may be configurable for GEO, MEO, and LEO satcom providers within a single terminal. Further, multi-faceted planar active electronically scanned array (AESA) panels may be optimized for simultaneous operations with multiple satellites or constellations as concepts of operations (CONOPS) demand.

Figure 2B:
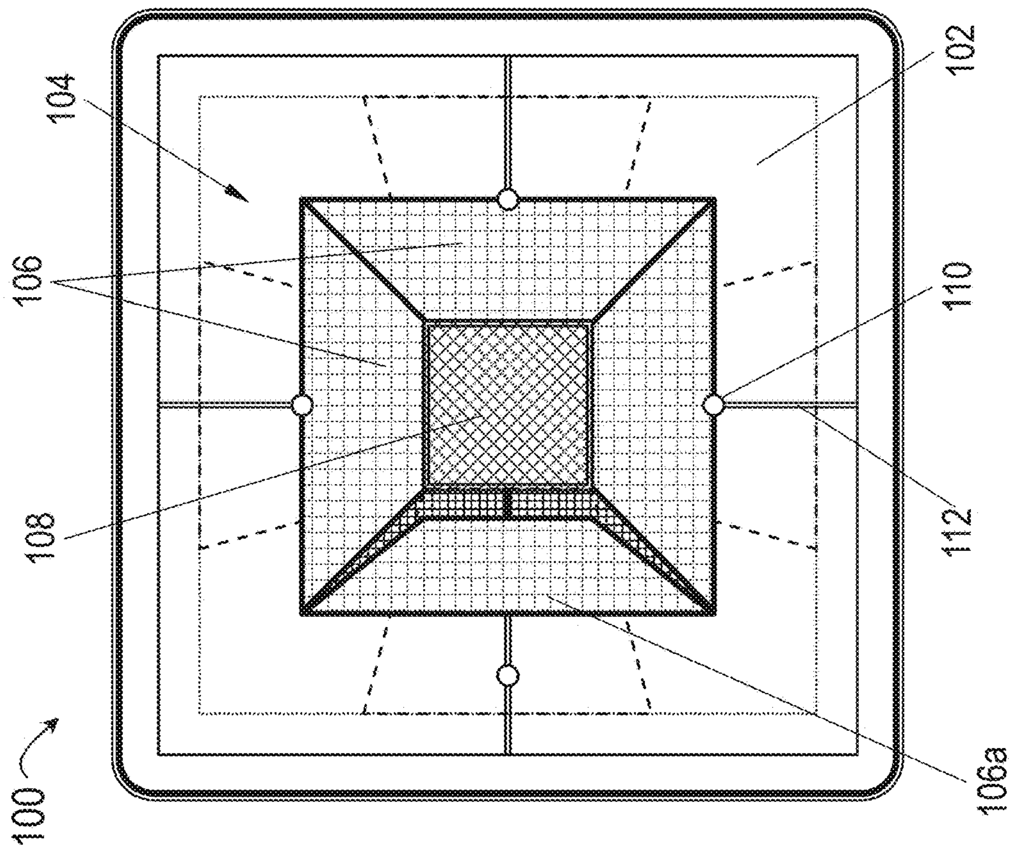
FIGS. 2A and 2B are overhead views of the satcom terminal apparatus of FIG. 1, wherein the AESA is shown in a deployed configuration.
Figure 2A:
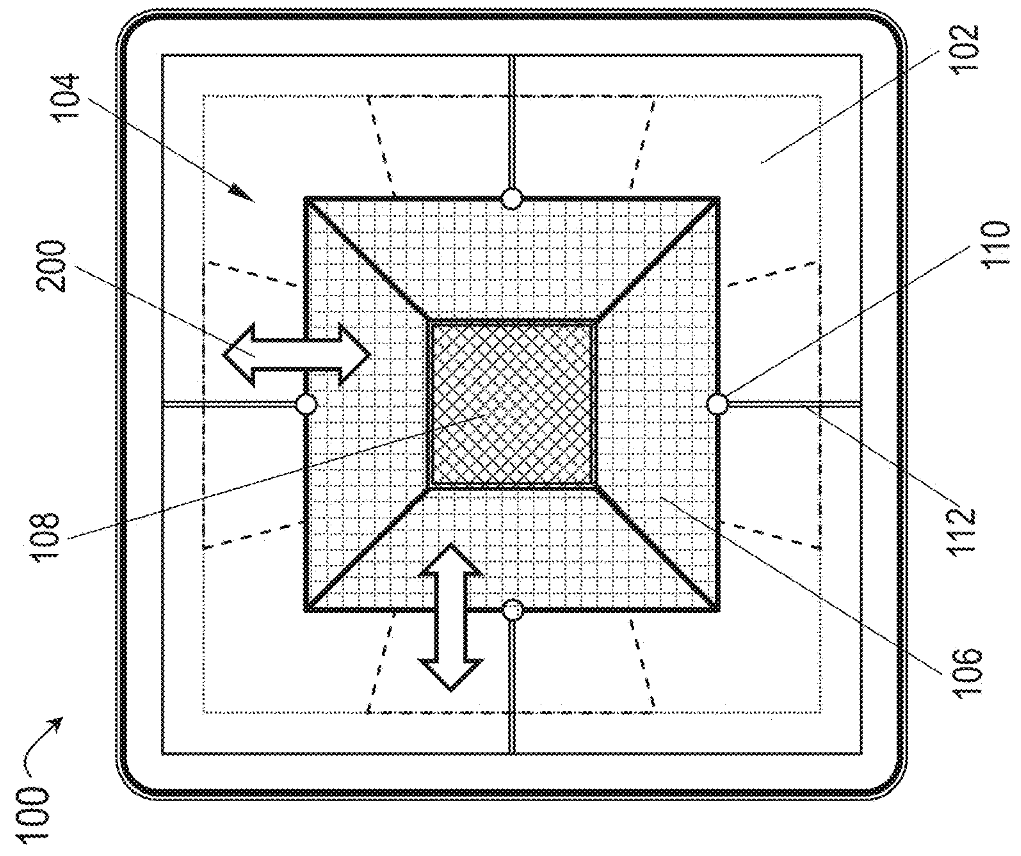

Referring now to FIGS. 1 and 2A, an overhead view of a satcom terminal apparatus 100 is shown. For example, the satcom terminal apparatus 100 may be embedded in or otherwise incorporated into a transport trailer and/or ground vehicle as described below, e.g., mounted atop said vehicle or trailer. The satcom terminal apparatus 100 may include a base 102 and an active electronically scanned array (AESA) 104 including side subarray panels 106 and apex subarray panel 108. Each of the side panels 106 and the apex panel 108 may incorporate a subarray of AESA antenna elements (e.g., AESA cells) electronically steerable (e.g., by an array controller as disclosed below) to steer or focus electromagnetic (EM) energy transmitted or received by the subarray in a desired direction.

In embodiments, the AESA 104 of the satcom terminal apparatus 100 may have a stowed configuration, as shown by FIGS. 1 and 2, and at least one deployed configuration as disclosed below. For example, the base 102 may be a substantially flat horizontal surface, and when the AESA 104 is in the stowed configuration, the side panels 106 and apex panel 108 may be disposed substantially coplanar to the base 102. In embodiments, the apex panel 108 may be coupled to each of the side panels 106 by a top or upper edge thereof, and may be capable of passive or active mechanical rotation relative to the side panels. Similarly, each of the side panels 106 may be slidably coupled to the base 102 (e.g., by sliders 110 capable of lateral translation along tracks 112), such that the side panels may likewise passively or actively slide relative to the base to transition the AESA 104 between the stowed configuration shown by FIG. 1 and the deployed configuration shown by FIG. 2A (e.g., one of many such deployed configurations, as discussed below). In embodiments, with respect to passive sliding, rotating, or pivoting, the AESA 104 may be manually transitioned between stowed and deployed configurations; similarly, with respect to active sliding, rotating, or pivoting, the AESA may be transitioned between stowed and deployed configurations via electromechanical reconfiguration (e.g., directed by an array controller as discussed below).

Referring in particular to FIG. 2A, the AESA 104 is shown in a deployed configuration.

In embodiments, the AESA 104 may comprise an apex panel 108 and a set of N identically shaped side panels 106, where N is at least three such that the apex panel 108 has the shape of an N-sided polygon (e.g., a square apex panel and a set of four side panels as shown by FIGS. 1 and 2) and each of the side panels has a substantially trapezoidal shape (e.g., wherein the top edge is substantially parallel to the bottom edge). For example, the side panels 106 may be pivoted (200) to form a truncated pyramid with the apex panel 108, the side and apex subarray panels of the AESA 104 collectively capable of hemispherical satcom coverage as discussed below.

Referring in particular to FIG. 2B, in some embodiments the AESA 104 may be deployed in such a way that not all side panels 106, 106*a* share a common slant angle. For example, the side panels 106 may share a common slant angle while the side panel 106*a* may be deployed to a steeper slant angle. In some embodiments, the apex panel 108 may be configurable for operation when not substantially horizontal or parallel to the ground. Alternatively, the side panels 106, 106*a* may be configured with additional lead screws or other means of pivoting independently from the apex panel 108 such that one or more side panels 106*a* may be configurable to different slant angles while the apex panel remains horizontal, e.g., for GEO operations.

Figure 3A:
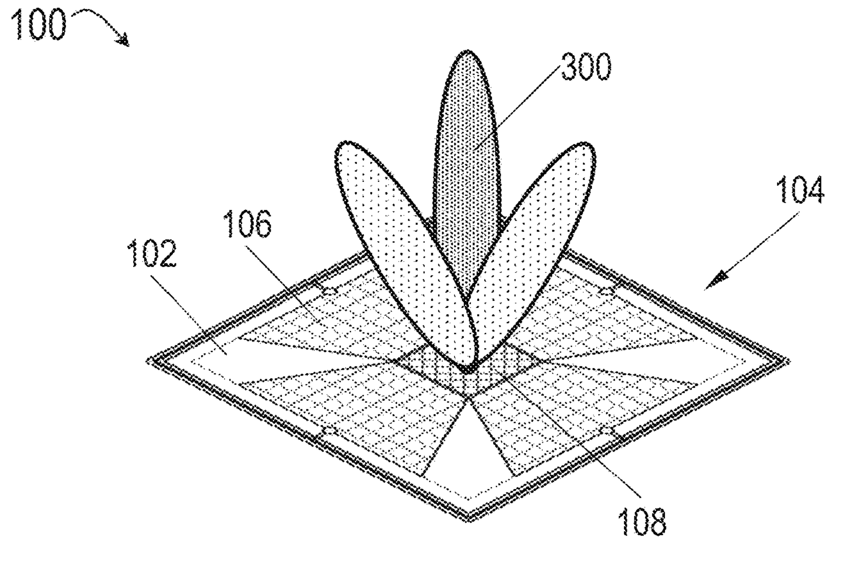
FIGS. 3A and 3B are isometric views of the satcom terminal apparatus of FIG. 1 wherein the AESA is respectively shown in a stowed and a deployed configuration.
Figure 3B:
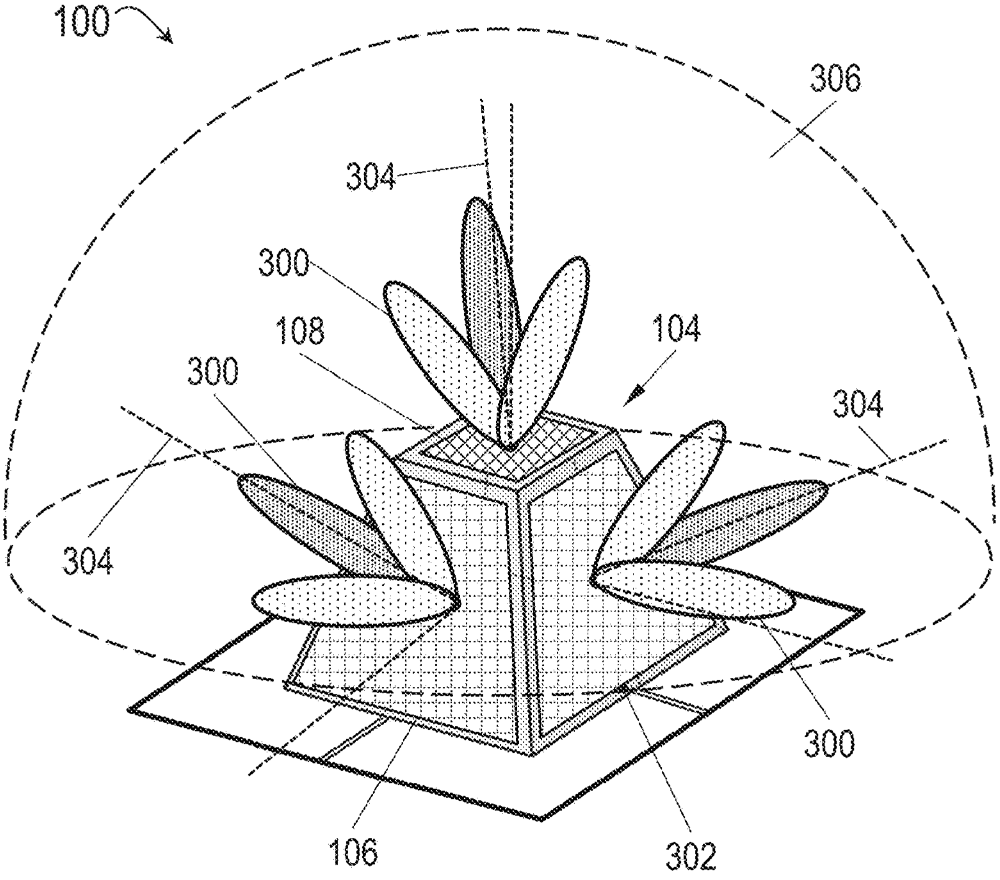

Referring now to FIGS. 3A and 3B, the satcom terminal apparatus 100 is shown with the AESA 104 in respectively a stowed and a deployed configuration.

Referring in particular to FIG. 3A, when the AESA 104 is in the stowed configuration the apex panel 108 and side panels 106 may collectively function as a flat planar AESA, e.g., wherein transmitted and received EM energy 300 may be electronically steered and/or focused in a desired direction. For example, the stowed configuration of the AESA 104 may provide for near instantaneous planar AESA coverage once the embodying vehicle or trailer comes to stop. In some embodiments, the AESA 104 may provide planar AESA coverage in motion, e.g., when the trailer or vehicle is in motion.

Referring in particular to FIG. 3B, in embodiments the AESA 104 may be transitioned (e.g., manually or electromechanically) from the stowed configuration shown by FIG. 3A to the deployed configuration shown by FIG. 3B by pivoting the side panels 106 inward such that the side panels are tilted to a desired slant angle 302 relative to the base 102. For example, when the AESA 104 is in the deployed configuration, the truncated pyramid formed by the apex panel 108 and the side panels 106 may enable each of the apex panel and the side panels to function as a planar AESA subarray wherein transmitted and received EM energy 300 may be focused by each of the apex and side subarray panels (e.g., via the component AESA elements of each subarray panel) to a desired scanning angle 304 (e.g., facet slant angle, combined elevation/azimuthal angle) relative to the horizon or zenith, which scanning angle may be optimized according to satellite constellation geometries to optimize performance. In this way, the AESA 104 may be capable of scanning satcom operations through a substantially hemispherical field of view 306. With respect to each of the apex panel 108 and side panels 106, transmitted and received EM energy 300 may be selected for target frequency, target frequency band, target polarization (horizontal, vertical, circular), and other array attributes as needed.

In embodiments, the AESA 104 (and the apex and side subarray panels 108, 106 thereof) may be compatible with a variety of planar AESA architectures including, but not limited to: moderate or narrow instantaneous bandwidth (IBW) architectures (e.g., advanced printed aperture (APA) stacked microstrip patch; dielectric resonator antenna (DRA); UWB polarization agile architectures (e.g., tightly coupled dipole array (TCDA); planar UWB modular antenna (PUMA); Vivaldi; current loop); half-duplex AESA architectures; and/or full-duplex AESA architectures. In some embodiments, one or more of the apex panel 108 or the side panels 106 may be configured for subarray-level digital beamforming (DBF), providing for simultaneous, independently steered beams for each subarray panel. In some embodiments, the AESA 104 may be transitionable to a deployed configuration while the trailer or ground vehicle is in motion, providing for comms-on-the-move (COTM) mobile satcom operations. In some embodiments, the truncated pyramid formed by the AESA 104 in the deployed configuration may be electromechanically reconfigured (e.g., by adjusting the slant angle 302 of the side panels 106 relative to the base 102) based on, e.g., the latitude of the mission theater and/or a required elevation angle for satcom operations with a particular satellite or constellation. For example, the AESA 104 may be configurable for one or more of: high-gain large panel GEO operations (e.g., when in the stowed configuration); tracking multiple satellites via individual subarray panels and/or direction-finding functionalities; simultaneous multi-constellation operations; and/or GEO, MEO, and LEO operations via a single satcom terminal apparatus 100. In embodiments, target frequencies and/or target frequency bands for transmission and reception of EM energy 300 may be selected from anywhere in the C-band (e.g., 3.7-4.2 GHZ (FCC) or 4-8 GHZ (IEEE)), X-band (e.g., 8-12 GHZ), Ku-band (e.g., 12-16 GHz), or Ka-band (e.g., 26.5-40 GHZ).

Figure 4A:
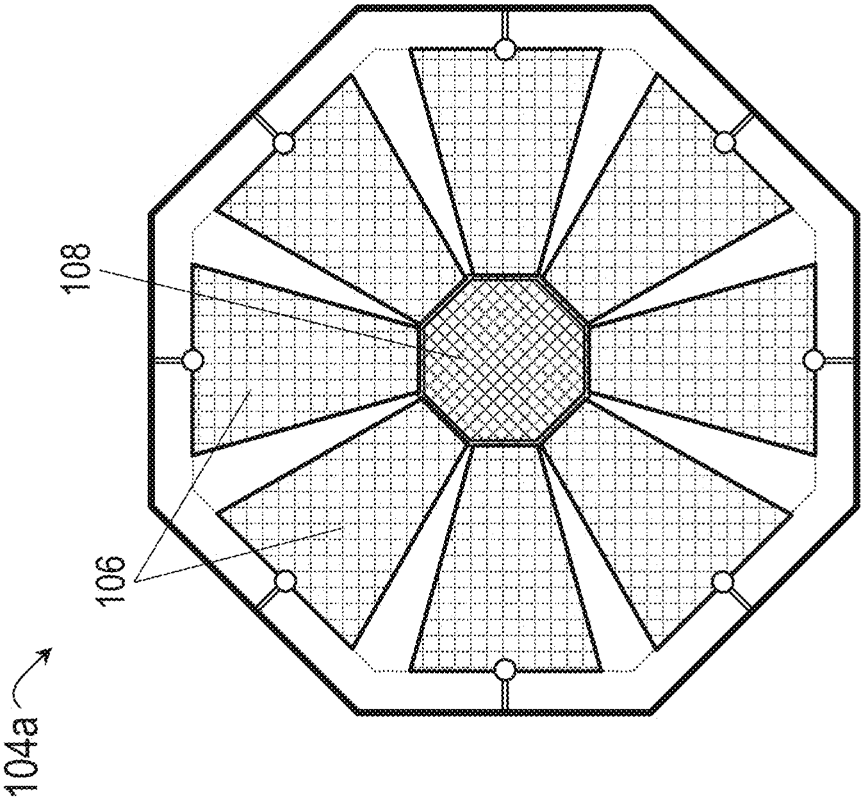
FIGS. 4A and 4B are overhead views of the satcom terminal apparatus of FIG. 1 wherein the AESA is differently configured according to example embodiments of this disclosure.

Referring now to FIG. 4A, the AESA 104*a* may be implemented and may function similarly to the AESA 104 of FIG. 1, except that the AESA may incorporate a greater or lesser number of side subarray panels 106 than the four-side-panel AESA 104 shown by FIGS. 1 through 3B. For example, the AESA 104*a* may incorporate a set of eight substantially trapezoidal side subarray panels 106, such that the apex panel 108 has an octagonal shape. Similarly, the AESA 104*a* may alternatively incorporate three, five, six, or any other appropriate number of N similarly shaped side subarray panels 106, such that the apex panel 108 takes the shape of the appropriate N-sided polygon.

Figure 4B:
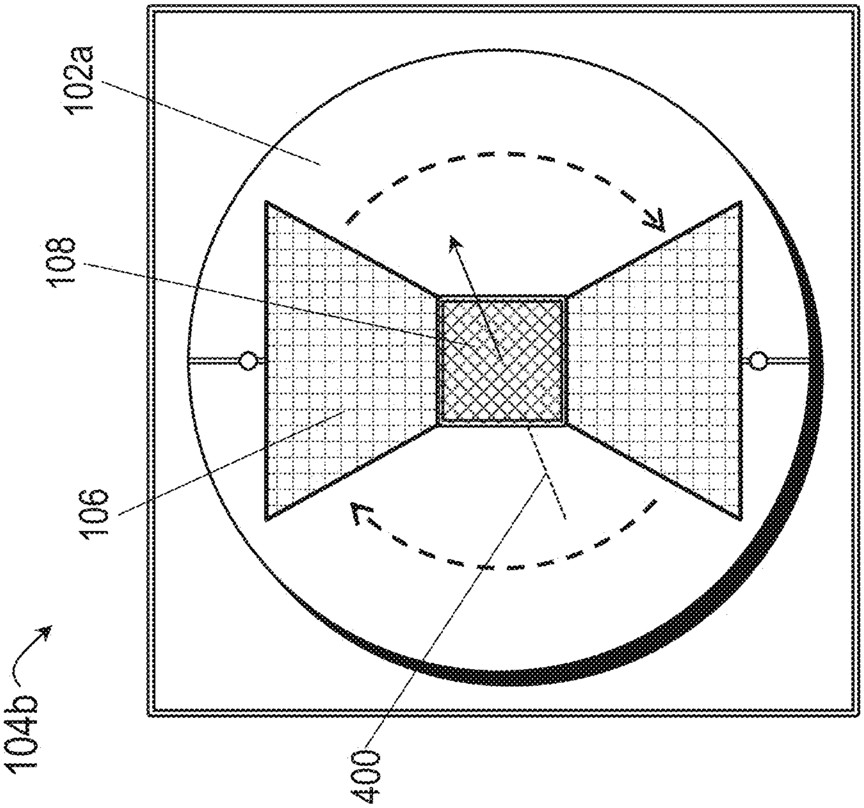

Referring also to FIG. 4B, the AESA 104*b* may be implemented and may function similarly to the AESA 104, 104*a* of FIGS. 1 through 4A, except that the AESA 104*b* may incorporate two side subarray panels 106 attached to a rotatable base 102*a* (e.g., rotatable relative to a vertical axis 400 (e.g., z-axis). For example, via electromechanical (or manual) pivoting of the side panels 106 to a desired elevation angle, and electromechanical (or manual) rotation of the base 102 to a desired azimuthal angle, the AESA 104*b* may be capable of transmission and reception throughout the full hemispherical field of view (306, FIG. 3B).

Figure 5A:
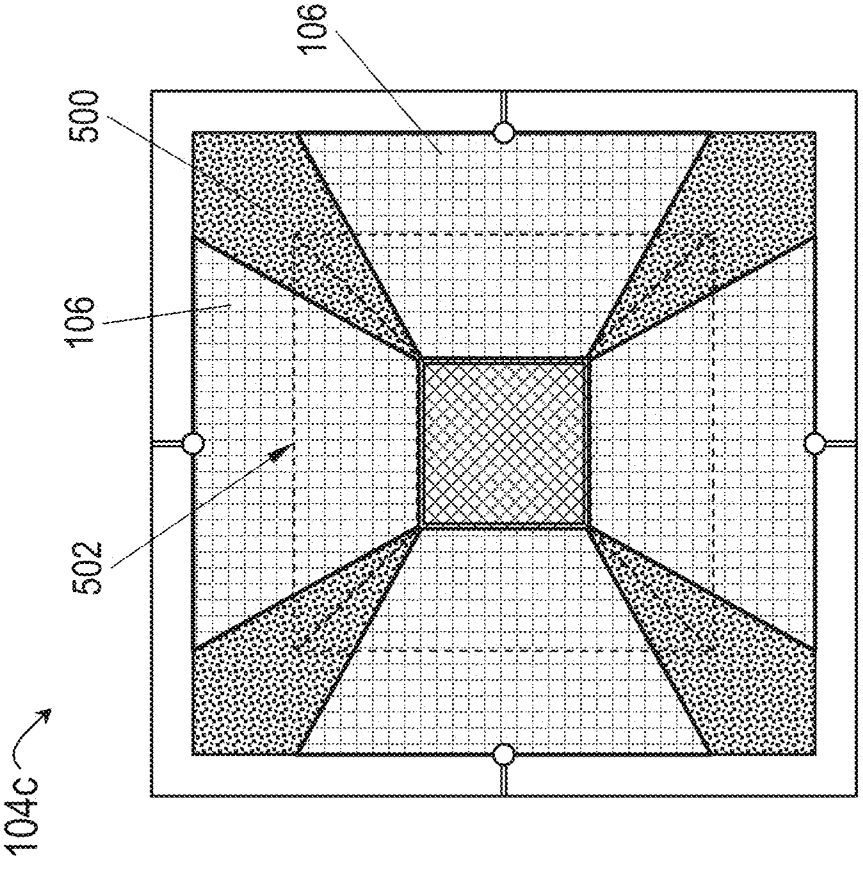
FIGS. 5A and 5B are overhead views of the satcom terminal apparatus of FIG. 1 wherein the AESA further incorporates base AESA subarray panels.

Referring now to FIG. 5A, the AESA 104*c* may be implemented and may function similarly to the AESA 104, 104*a*-104*b* of FIGS. 1 through 4B, except that the AESA 104*c* may additionally incorporate mechanically static but electronically steerable planar AESA base subarray panels 500 between each pair of adjacent side subarray panels 106.

In embodiments, the base panels 500 may function similarly to the side panels 106 and apex panel 108, except that the base panels 500 remain fixed to the base 102 such that the AESA 104*c* may, when in the stowed configuration, optimally function as a full panel planar AESA. Further, when the AESA 104*c* is transitioned from the stowed to the deployed configuration, and the side panels 106 are slid inward and tilted upward (502; as also shown by, e.g., FIG. 3B), the base panels 500 may remain fixed to the base 102 and may provide additional planar AESA functionality, e.g., for GEO satcom operations.

Figure 5B:
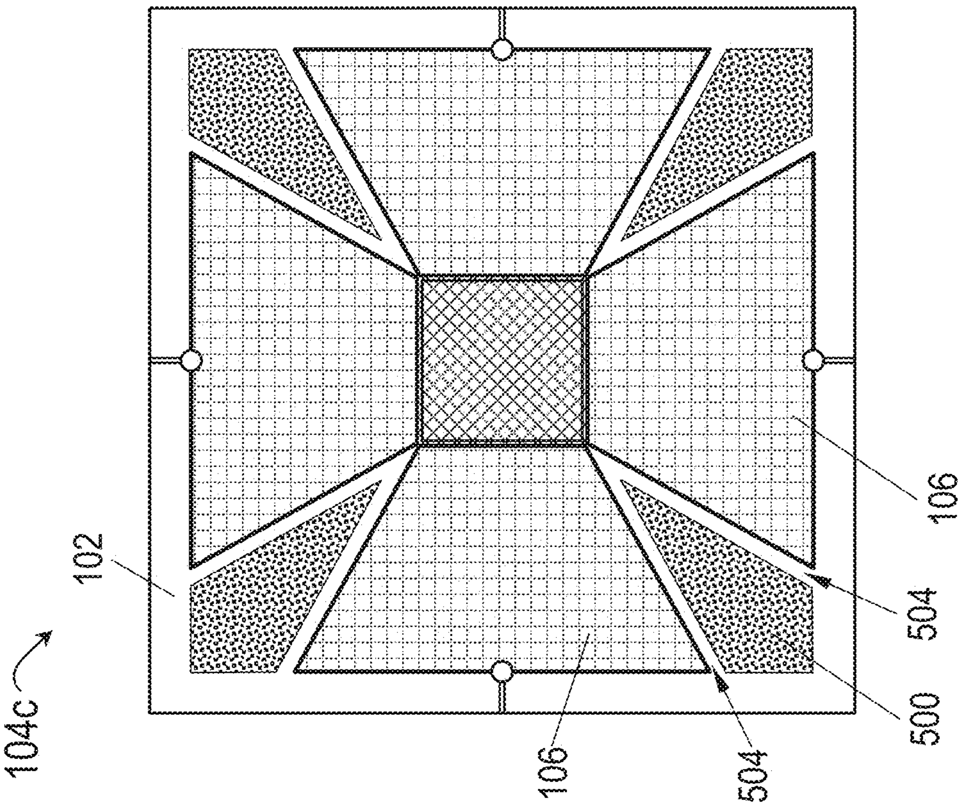

Referring also to FIG. 5B, in some embodiments the AESA 104*c* may incorporate inter-subarray gaps 504 between the base panels 500 and stowed side panels 106. For example, the gaps 504 may counteract interference between the side panels 106 and base panels 500 when the side panels are in the truncated-pyramid deployed configuration (e.g., without interfering with the modest side lobe levels required for Ku-band GEO satcom operations).

Figure 6:
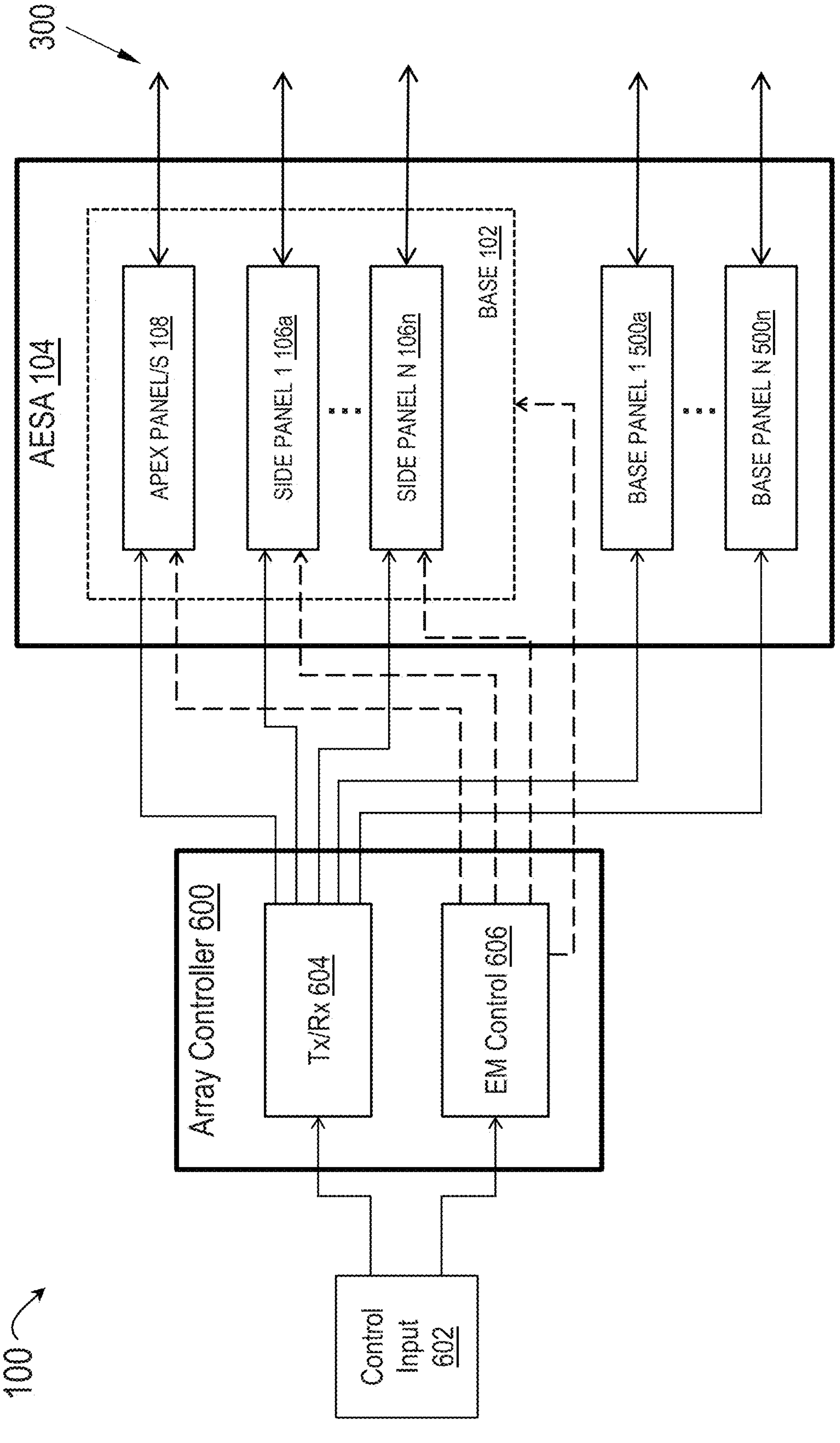
FIG. 6 is a block diagram of the satcom terminal apparatus of FIG. 1.

Referring now to FIG. 6, the satcom terminal apparatus 100 is shown.

In embodiments, the satcom terminal apparatus 100 may include an array controller 600. For example, the array controller 600 may incorporate one or more processors (along with appropriate memory and/or data storage for storing target frequencies, frequency bands, polarization settings, and other array attributes).

In embodiments, the array controller 600 may accept control input 602 from a user or operator (e.g., within the vehicle or trailer to which the satcom terminal apparatus 100 is mounted). For example, based on control input 602, the array controller may set or adjust array attributes for transmission/reception (604) of EM energy 300. For example, the array controller 600 may adjust target frequencies, frequency bands, signal polarization, and/or other array attributes for each of the apex subarray panel 108 (and/or segments thereof, as discussed below), side subarray panels 106*a*-106*n*, and/or base subarray panels 500*a*-500*n*. Further, based on control input 602, the array controller 600 may mechanically control or reconfigure (606) the apex panel 108, side panels 106*a*-106*n*, and/or base 102 (e.g., where the base rotates relative to the platform, trailer, or vehicle as described above).

Figure 7A:
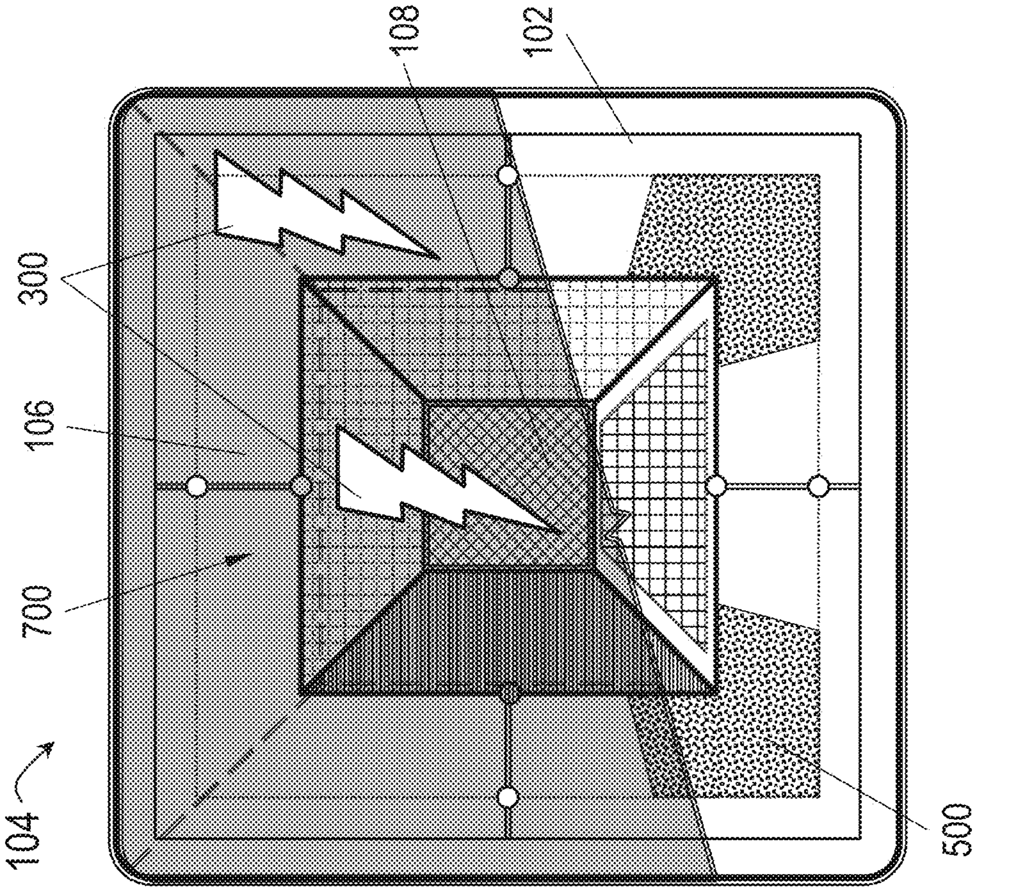
FIGS. 7A and 7B are overhead views of the satcom terminal apparatus of FIG. 1 incorporating panel protection measures for the AESA component panels.

Referring now to FIG. 7A, in some embodiments the AESA 104 may incorporate a radome 700 in one or more segments to cover and protect the apex panel 108, side panels 106, and/or base panels 500 but allow the free passage of transmitted and received EM energy 300. For example, the radome 700 may be a volumetric radome mounted to the base 102 or to the vehicle, trailer, or platform to which the satcom terminal apparatus (100, FIG. 1) is mounted. In some embodiments, the radome 700 may enclose enough space to protect the AESA 104 whether the AESA is in the flattened stowed configuration or a truncated-pyramid deployed configuration.

Figure 7B:
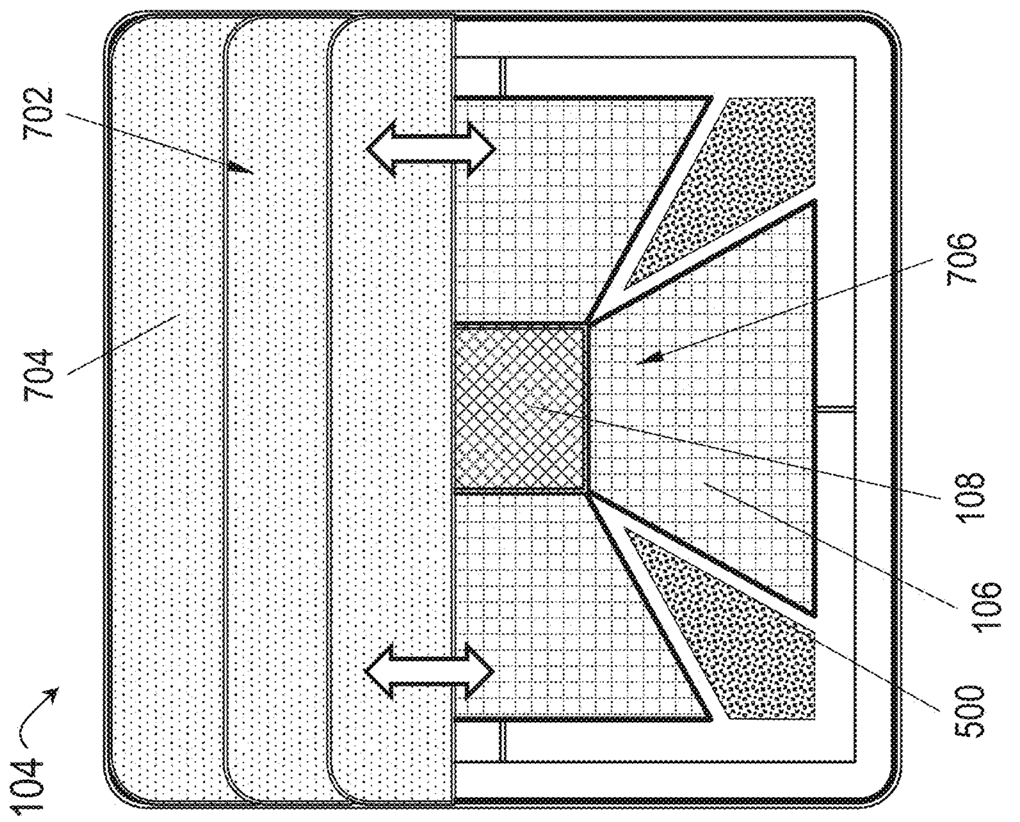

Referring now to FIG. 7B, in some embodiments the AESA 104 may incorporate a removable cover 702 configured to protect the AESA from environmental damage (or from detection) when in the stowed configuration. For example, the cover 702 may incorporate one or more segments 704 extendible across the side panels 106, apex panel 108, and/or base panels 500 when in the stowed configuration (e.g., manually or electromechanically extendible, retractable, and/or controllable by the array controller (600, FIG. 6) based on received control input (602, FIG. 6). In some embodiments, one or more of the apex panel 108, side panels 106, and/or base panels 500 may incorporate ballistic dielectric material protection, e.g., a planar AESA superstrate 706 applied to the apex, base, or side panel. In some embodiments, the cover 702 may be fashioned from functional material similar to the radome 700, providing both protection and allowing free passage of EM energy 300 to and from the AESA 104 when in the stowed configuration.

Figure 8A:
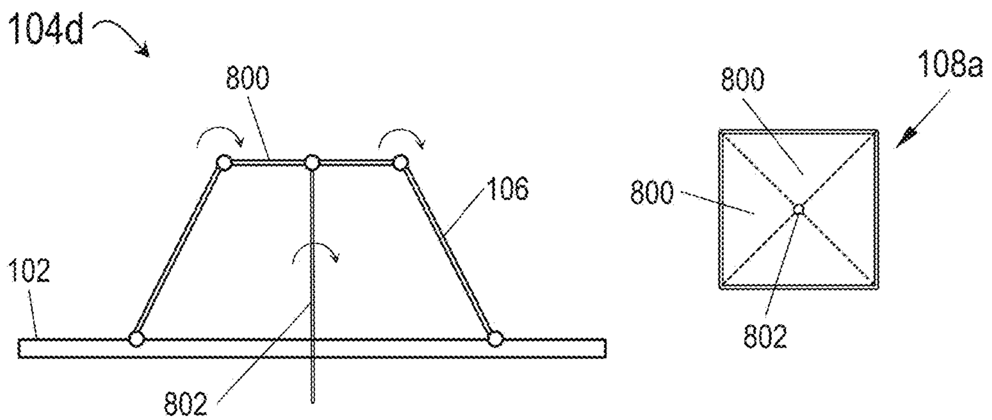
FIGS. 8A through 8C are cross sectional views of the satcom terminal apparatus of FIG. 1 wherein the AESA incorporates a segmented apex panel and lead screw for adjusting the panel segments.

Referring now to FIG. 8A, the AESA 104*d* may function and may be implemented similarly to the AESA 104, 104*a*-104*c* of FIGS. 1 through 5B, except that the AESA 104*d* may incorporate a segmented apex panel 108*a* comprising a set of AESA panel segments 800 and lead screw 802.

In embodiments, the segmented apex panel 108*a* may incorporate N panel segments 800 (e.g., a panel segment for each side panel 106), or some other number of panel segments. For example, the lead screw 802 may provide for manual or electromechanical adjustment of the AESA panel segments 800 to additional elevational angles beyond those achievable by the side panels 106. Further, the AESA panel segments 800 may be configurable for additional beams (e.g., a combination of transmitting beams and receiving beams), or for pointing multiple beams (EM energy 300*a*, 300*b*) at a higher gain.

Figure 8B:
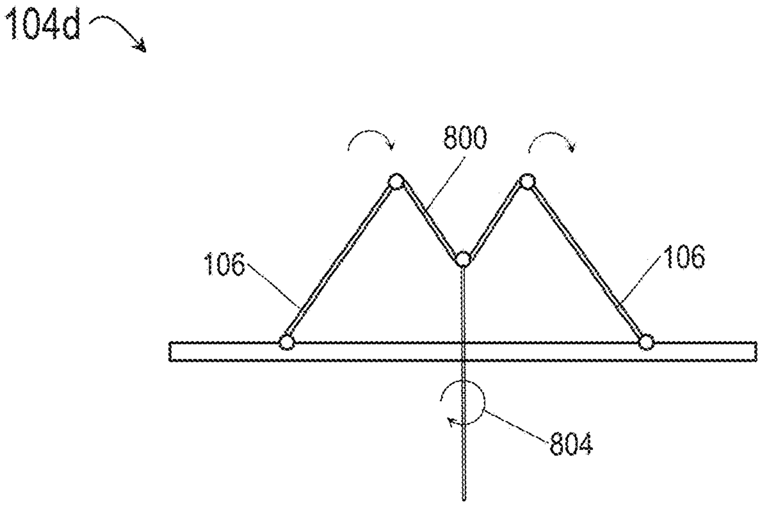
Figure 8C:
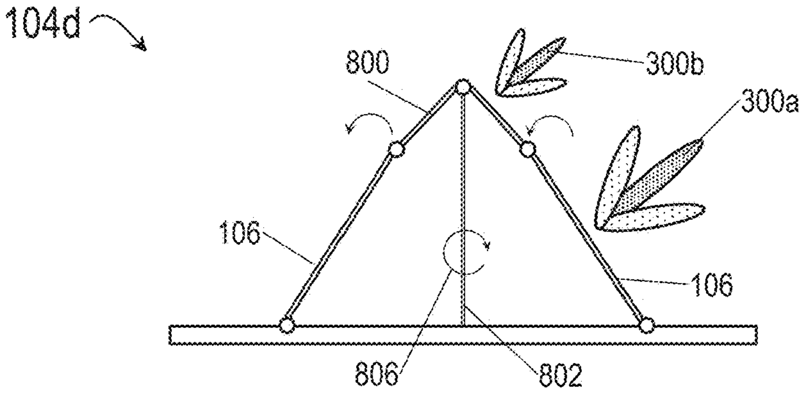

In embodiments, referring also to FIG. 8B, the lead screw 802 may be manually or electromechanically rotated in a first direction 804 (e.g., clockwise or counterclockwise) to lower the lead screw and pivot the AESA panel segments 800 into a concave (e.g., valley, depression, inverted pyramid) configuration. Similarly, referring also to FIG. 8C, the lead screw 802 may be rotated in the opposing direction 806 to raise the lead screw and pivot the AESA panel segments 800 into a convex or peak configuration (e.g., to a different slant angle or slope than that of the side panels 106).

Figure 9A:
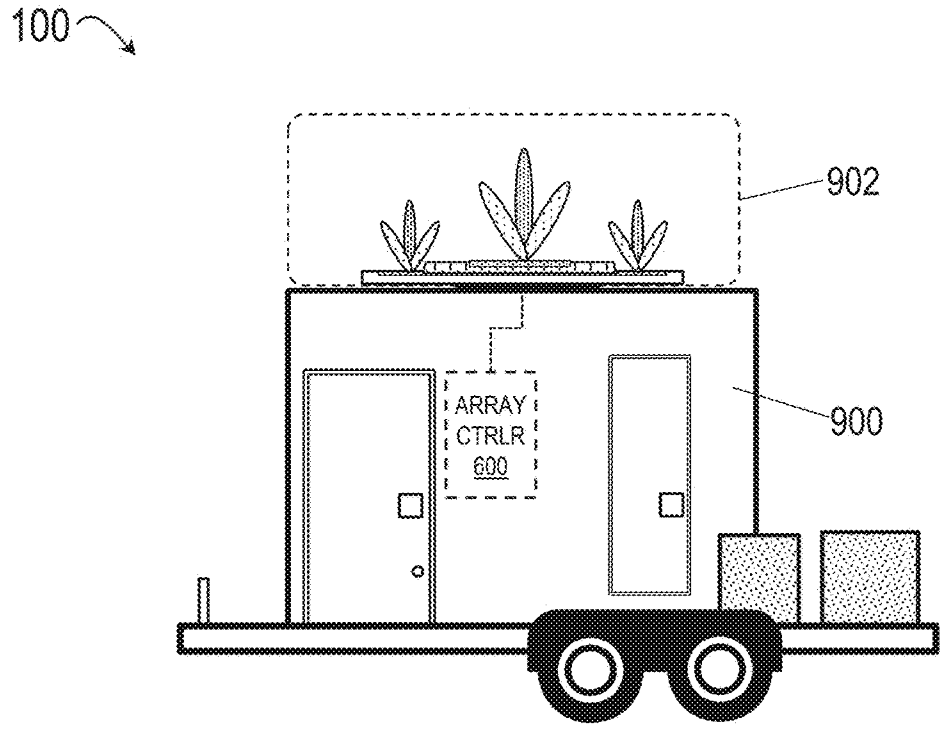
FIGS. 9A and 9B are profile views of the satcom terminal apparatus of FIG. 1 mounted to a transport vehicle according to example embodiments of this disclosure, wherein the AESA is respectively in the stowed and the deployed configuration.

Referring now to FIG. 9A, in some embodiments the satcom terminal apparatus 100 may be mounted to a trailer 900, self-propelled ground vehicle, or other mobile platform. In some embodiments, the satcom terminal apparatus 100 may be transported on and deployed from the trailer 900, e.g., as a mechanical pallet 902 removable from the trailer and rapidly deployed from the ground. For example, when deployed via a mechanical pallet 902, the satcom terminal apparatus 100 may be rotated relative to a reference set of absolute terrestrial coordinates (e.g., as determined by a global navigational satellite system (GNSS) receiver) rather than relative to an embodying mobile platform.

In embodiments the AESA 104 of the satcom terminal apparatus 100 may be maintained in the stowed configuration (e.g., flat) as a default status, e.g., for when the trailer 900 or platform is in motion. For example, when the trailer 900 is no longer in motion the AESA 104 may be immediately capable of COTH operations (e.g., for engaging GEO satcom providers) while in the stowed configuration (e.g., via the side subarray panels 106, apex subarray panel/s 108, 800, and base subarray panels 500).

Figure 9B:
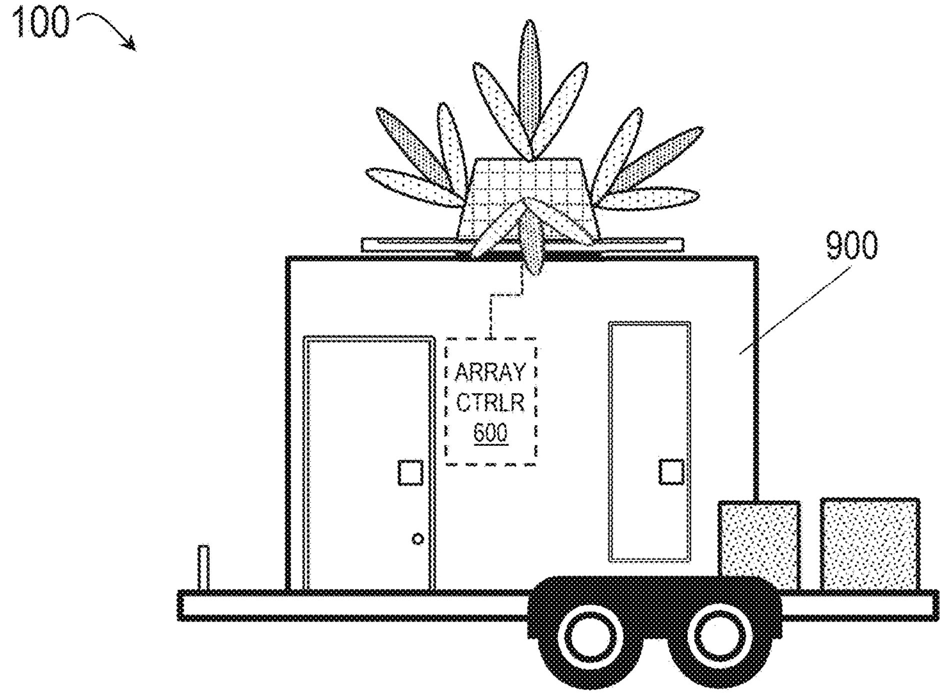

In embodiments, referring also to FIG. 9B, when the trailer 900 is no longer in motion the AESA 104 may be electromechanically reconfigured in under 2 minutes under ideal conditions (e.g., in the truncated-pyramid deployed configuration, according to predetermined array attributes) for COTH operations (e.g., for engaging LEO or MEO providers as well as geostationary satellites) throughout the substantially hemispherical field of view (304, FIG. 3B). For example, whether the AESA 104 is in the stowed or the deployed configuration, the array controller 600 may be disposed within the trailer 900 such that an operator within the trailer may control mechanical reconfiguration of the AESA and select or adjust array attributes (e.g., target frequencies or frequency bands, signal polarizations) for transmission and reception of EM energy 300 via each side panel 106, apex panel 108, and/or base panel 500 in the desired elevational/azimuthal directions and at a desired frequency. In some embodiments, the AESA 104 may further be capable of limited COTM operations (e.g., while the trailer 900 is in motion and an operator is disposed therewithin) when in the stowed configuration shown by FIG. 9A, and even in the deployed configuration (as shown by, e.g., FIG. 3B) if the terrain is sufficiently gentle and/or with sufficiently high orbiting satellites (e.g., geostationary).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A satellite communications (satcom) terminal apparatus, comprising:

a plurality of active electronically scanned array (AESA) panels collectively having a stowed configuration and a deployed configuration, each AESA panel including one or more AESA elements, the plurality of AESA panels operatively coupled to an array controller and comprising:

a plurality of N side panels, where N is an integer not less than two, each side panel slidably attached to a flat surface at a bottom edge;

and an apex panel having an N-sided polygonal shape, each side panel pivotably attached to the apex panel at a top edge opposite the bottom edge;

wherein the stowed configuration corresponds to an arrangement of the plurality of AESA panels coplanar with the flat surface;

wherein the deployed configuration corresponds to an arrangement of the plurality of AESA panels in a truncated pyramid wherein each side panel is inclined at a slant angle to the flat surface;

wherein the plurality of AESA panels is collectively configured, when in the stowed configuration, for steerable transmission and reception, of electromagnetic (EM) energy associated with at least one array attribute selected from a group including a target frequency, a target frequency band, and a target polarization;

wherein each of the plurality of AESA panels is individually configured, when in the deployed configuration, for electronically steerable transmission and reception of EM energy associated with the at least one array attribute;

and wherein the array controller is configured for selection and adjustment of the at least one array attribute.

2. The satcom terminal apparatus of claim 1, wherein the array controller is configured for:

selection of each slant angle:

and electromechanical transitioning of the plurality of AESA panels between the stowed configuration and the deployed configuration.

3. The satcom terminal apparatus of claim 1, wherein:

the plurality of AESA panels is manually deployable between the stowed and deployed configurations.

4. The satcom terminal apparatus of claim 1, wherein each of the plurality of AESA panels is deployed to a common slant angle.

5. The satcom terminal apparatus of claim 1, wherein the plurality of AESA panels includes:

at least one first AESA panel deployed to a first slant angle;

and at least one second AESA panel deployed to a second slant angle different from the first slant angle.

6. The satcom terminal apparatus of claim 1, wherein each side panel has a trapezoidal shape.

7. The satcom terminal apparatus of claim 1, wherein the plurality of AESA panels further comprises:

a plurality of base panels fixed to the flat surface, each base panel disposed between two adjacent side panels.

8. The satcom terminal apparatus of claim 7, wherein the flat surface includes a gap between each base panel and the two adjacent side panels.

9. The satcom terminal apparatus of claim 1, wherein the satcom terminal apparatus is configured for half-duplex transmission and reception of EM energy.

10. The satcom terminal apparatus of claim 1, wherein the satcom terminal apparatus is configured for full-duplex transmission and reception of EM energy.

11. The satcom terminal apparatus of claim 1, wherein the target frequency band is selected from a group including C-band, X-band, Ku-band, and Ka-band.

12. The satcom terminal apparatus of claim 1, wherein the array controller is configured for digital beamforming via at least one side panel of the plurality of side panels.

13. The satcom terminal apparatus of claim 1, comprising:

at least one dielectric ballistic material configured for protection of the plurality of AESA panels, the at least one dielectric ballistic material comprising at least one of:

a planar superstrate applied to at least one of a) side panel of the plurality of side panels or b) the apex panel;

or a radome configured for protection of the plurality of AESA panels.

14. The satcom terminal apparatus of claim 1, further comprising:

at least one protective cover disposed over the plurality of AESA panels and configured to cover the AESA panels when the satcom terminal apparatus is not in use;

wherein the array controller is configured to electromechanically deploy and retract the at least one protective cover.

15. The satcom terminal apparatus of claim 1, wherein the plurality of AESA panels is rotatable relative to at least one of:

the flat surface;

or one or more absolute terrestrial coordinates.

16. The satcom terminal apparatus of claim 1, wherein the apex panel comprises a plurality of panel segments pivotably attached to a central lead screw;

wherein the plurality of panel segments is configurable as a pyramid by rotating the lead screw in a first direction;

and wherein the plurality of panel segments is configurable as an inverted pyramid by rotating the lead screw in a second direction opposite the first direction.

17. The satcom terminal apparatus of claim 16, wherein the array controller is configured for electromechanical reconfiguration of the plurality of panel segments.

18. The satcom terminal apparatus of claim 1, further comprising:

a vehicle or mobile platform;

wherein the flat surface is attached to the vehicle or mobile platform.

19. The satcom terminal apparatus of claim 18, wherein:

the AESA is detachable from the mobile platform;

and wherein the plurality of AESA panels is collectively configured for steerable transmission and reception of EM energy when detached from the mobile platform.

20. The satcom terminal apparatus of claim 18, wherein:

the array controller is disposed within the mobile platform;

and wherein the array controller is configured to accept control input from an occupant of the mobile platform.

* * * * *